United States Patent
Huener et al.

(10) Patent No.: US 7,799,250 B2
(45) Date of Patent: Sep. 21, 2010

(54) CERAMIC MATERIALS FOR FRICTION LININGS

(75) Inventors: Ronald Huener, Baar (DE); Moritz Bauer, Augsburg (DE); Peter Winkelmann, Thierhaupten (DE)

(73) Assignee: Audi AG (DE)

( * ) Notice: Subject to any disclaimer, the term of this patent is extended or adjusted under 35 U.S.C. 154(b) by 586 days.

(21) Appl. No.: 11/355,819

(22) Filed: Feb. 16, 2006

(65) Prior Publication Data

US 2006/0186565 A1 Aug. 24, 2006

Related U.S. Application Data

(62) Division of application No. 10/379,756, filed on Mar. 5, 2003, now abandoned.

(30) Foreign Application Priority Data

Mar. 7, 2002 (DE) .......................... 102 10 175

(51) Int. Cl.
*C01B 31/00* (2006.01)
*F16D 69/02* (2006.01)
*C04B 35/04* (2006.01)

(52) U.S. Cl. ............. 264/29.7; 264/29.1; 264/29.6

(58) Field of Classification Search ........... 264/29.1, 264/29.6, 29.7; 523/155, 156
See application file for complete search history.

(56) References Cited

U.S. PATENT DOCUMENTS

| 4,019,912 A | * | 4/1977 | Augustin | ............... 106/36 |
|---|---|---|---|---|
| 5,725,077 A | * | 3/1998 | Taylor et al. | ............. 188/251 A |
| 5,866,636 A | | 2/1999 | Nitto et al. | |
| 6,110,268 A | | 8/2000 | Gross et al. | |
| 6,231,791 B1 | | 5/2001 | Heine et al. | |
| 6,248,269 B1 | | 6/2001 | Dietrich et al. | |
| 6,265,071 B1 | | 7/2001 | Gross et al. | |
| 6,273,222 B1 | | 8/2001 | Rebstock et al. | |

FOREIGN PATENT DOCUMENTS

| DE | 197 10 105 A1 | 9/1998 |
|---|---|---|
| DE | 197 11 830 | 10/1998 |
| DE | 197 27 585 | 2/1999 |
| DE | 197 27 586 | 2/1999 |
| DE | 197 27 587 | 2/1999 |
| EP | 0 987 463 | 3/2000 |
| WO | WO-95/07418 | 3/1995 |
| WO | WO-02/070431 | 9/2002 |

OTHER PUBLICATIONS

Friedrich, Horst and Mordike, Barry. Magnesium Technology, 2006, Springer, pp. 57-58.*

* cited by examiner

*Primary Examiner*—Joseph S Del Sole
*Assistant Examiner*—Robert Dye
(74) *Attorney, Agent, or Firm*—Connolly Bove Lodge & Hutz LLP

(57) ABSTRACT

Ceramic friction linings comprising a material consisting essentially of metal oxides which are present in the form of a sintered ceramic or in the form of ceramic particles bound by carbon and/or carbides, processes for producing them and their use in combination with ceramic friction bodies, in particular for high-performance brakes.

11 Claims, No Drawings

CERAMIC MATERIALS FOR FRICTION LININGS

CROSS REFERENCE TO RELATED APPLICATION

The present application is a division of application Ser. No. 10/379,756, filed Mar. 5, 2003.

FIELD OF THE INVENTION

The invention relates to ceramic materials for friction linings.

BACKGROUND OF THE INVENTION

In the search for suitable brake linings for high-performance brake systems using ceramic brake disks, the conventional organically bonded brake lining compositions reach their limits because of the high temperatures and high wear rates which occur. This becomes particularly clear in the case of friction pairings in which C/SiC or C/C—SiC is used as brake disk material. These materials are a ceramic which consists essentially of silicon carbide and secondary phases comprising silicon and carbon and is reinforced with carbon fibers, for example as described in DE-A 197 10 105. These materials are, as is known, produced by infiltration of porous C/C intermediate bodies (carbon reinforced with carbon fibers) with liquid silicon and reaction of at least part of the carbon with this to form silicon carbide. Temperatures of 1000° C. and more occur at the friction surface during braking in the case of such brake disks, which can result in decomposition of organically bonded brake linings.

In DE-A 197 27 587, the problem of the high operating temperatures during braking in a combination of brake disks comprising a short-fiber-reinforced C/SiC ceramic and a brake lining having an organically bonded matrix is solved by the brake disk being designed so that its thermal conductivity perpendicular to the disk surface is at least 20 W/m·K. Due to this high thermal conductivity, it is possible to use conventional, organically bonded brake linings in conjunction with the ceramic brake disk. However, the operating lives which are achieved for the linings are not satisfactory.

DE-A 197 27 586 discloses a combination of a C/SiC brake disk and a corresponding C/SiC brake lining, with the C/C intermediate body of the brake lining having a higher density (lower porosity) than the surface regions of the C/C intermediate body of the brake disk. This leads to a C/SiC having a relatively low strength being formed after liquid silicization of the C/C intermediate body of the brake lining because of its relatively low silicon carbide content. However, the overall frictional and wear behavior, in particular the comfort characteristics, is not yet satisfactory constant friction values are not obtained, the noise during braking is too loud and the performance when wet is unfavorable. DE-A 197 27 585 discloses the combination of a short-fiber-reinforced C/SiC ceramic brake disk and a brake lining comprising a sintered metal material or an inorganically bonded material comprising a ceramic binder phase which is preferably obtainable by complete or partial pyrolysis of at least one preceramic polymer and metal particles. Although this brake lining is able to withstand high temperatures, this system, too, is not yet satisfactory in respect of the braking behavior. DE-A 107 11 830 describes a process for producing friction linings for combination with brake disks comprising fiber-reinforced ceramic, in which a pressed body produced from carbon and metal particles is sintered.

It is therefore an object of the invention to provide friction linings which can be used in combination with friction bodies or friction disks made of ceramic materials, in particular C/SiC ceramic, do not decompose even at high temperatures and offer a constant frictional behavior and good comfort characteristics.

SUMMARY OF THE INVENTION

The present invention accordingly provides friction linings comprising a material consisting essentially of metal oxides which are present in the form of a sintered ceramic or in the form of ceramic particles bound by carbon and/or carbides, wherein the mass fraction of metal oxides in the material is at least 50%.

The mass fraction of metal oxides in the materials of these friction linings is preferably at least 60% and in particular at least 70%. The metal oxides can also be mixed oxides and preferably comprise at least one oxide of the elements of the group consisting of Ti, Zr, Al, B, Si, Ca and Mg. Preference is given to metal oxides which crystallize in layer lattices and have good tribological properties as a result of this crystalline structure. They will hereinafter also be referred to as "sheet ceramics". Preference is given to using magnesium aluminosilicates, talc which are also referred to as metal oxides, and particularly preferably magnesium oxide (MgO) as sheet ceramics. In the case of these preferred materials and the particularly preferred magnesium oxide, mass fractions of at least 50% of these oxides with the same preferred ranges are also used in the material of the friction lining. According to the invention, the friction linings further comprise additional additives such as inorganic binders, substances which modify the coefficient of friction, friction promoters or lubricants, with the sum of the mass fractions of these additives in the friction lining preferably being below 50%.

The present invention further provides friction systems capable of withstanding high temperatures, in particular brake systems, comprising friction linings whose materials consist, according to the invention, essentially of metal oxides and brake disks comprising ceramic materials, in particular. C/SiC or C/C—SiC materials. The friction linings are preferably used in the form of brake linings for ceramic brake disks, in particular those made of carbon-fiber-reinforced nonoxide ceramic. Here, the ceramic is typically stronger and harder than the lining material. The friction linings of the invention are particularly preferably used as brake linings for C/SiC brake disks or as friction partners for clutch bodies or disks made of C/SiC. The material of the friction linings is particularly advantageous for ceramic counterbodies having a high SiC content and is particularly well suited to friction bodies which have a mass fraction of SiC of at least 60% in the composition of the friction surface.

The present invention further provides for the use of the friction linings of the invention in clutch systems and brake systems for rail vehicles, aircraft and motor vehicles, preferably in combination with friction disks made of ceramic materials, in particular friction disks made of C/SiC or C/C—SiC materials.

If the friction lining is made up essentially of sintered ceramic the cohesion of the material is due to oxide-ceramic bonding during sintering. If instead essentially preformed ceramic particles are used, bonding within the friction material is effected, according to the invention, by means of carbon or carbides which are formed, in particular, during a thermal or carbonization treatment. Friction linings which are based on magnesium oxide and are bound by means of carbon or carbides have, in particular, surprisingly been found to be very effective and thermally stable. Additions of carbon, copper or tin, preferably in mass fractions of up to 10%, and inorganic bonding based on carbonized organic precursors for pyrogenic carbon have a positive effect on the coefficient of friction, the wear and the mechanical strength of metal oxide based materials for friction linings. The mass fractions of carbon and/or carbides in the materials of the friction linings are at least 5%.

Magnesium oxide is known as additive in a small amount of up to 20% in combination with reinforcing fibers which are not asbestos, inorganic fillers and heat-curable resins for brake lining compositions from U.S. Pat. No. 5,866,636. In the composite material of these brake linings, MgO performs the task of removing deposits on the brake disk and thereby suppressing low-frequency noise during braking. Relatively high contents of MgO lead to increased damping of the low-frequency brake noise, while relatively low contents lead to reduced wear of the friction partner and to higher resistance to fading. These opposed requirements result in a desired volume fraction of from 3 to 20% for the MgO. It is not stated that such lining compositions can be used together with ceramic brake disks. For the reasons set forth in the introduction, in particular because of the high operating temperatures, organically bound lining materials can be readily used only in particular cases, as described in DE-A 197 27 586.

However, in combination with friction disks, in particular brake disks made of ceramic materials, the use of materials having high mass fractions viz. at least 50%, preferably at least 60% and particularly preferably at least 70%, of metal oxides, preferably comprising hard sintered sheet ceramic, in particular MgO, has surprisingly been found to be particularly advantageous for brake linings. Thus, both the hardness of these materials and the associated wear resistance and also the excellent sliding properties of the sheet ceramics are particularly favorable and make them suitable for combination with brake disks made of ceramic materials.

A further advantage of the use of metal oxides and ceramics in which they are present as main component of friction materials in brake linings is their comparatively low thermal conductivity. Since the heat generated in the contact layer of the friction pairing on rubbing together has to be kept away from the brake shoe or caliper but high temperatures around 1000° C. and above are generated in the case of ceramic brake disks during braking, the thermal insulation action of the metal oxides is advantageous.

The tribological properties of the friction pairing are influenced essentially by the type of inorganic binder phase of the friction material. In contrast to conventional organically bound friction materials, the metal oxides and the further additives are bound by oxide ceramic bonding or by means of phases of carbon and/or carbides. The binder phase is thus formed by thermally stable compounds which are not decomposed at the use temperatures. The inorganic binder phase is typically formed in the thermal treatment of the green body of the friction material.

The present invention further provides a suitable process for producing the materials for the friction linings. In the variant with inorganic binding by means of carbon and/or carbides, a shapable mixture of pulverulent ceramic or metal oxides, additives and organic binders is produced in a first step. The mixture is then, for example, brought into the desired shape by pressing and cured with the aid of the thermally curable organic binder. The green body produced in this way is carbonized, i.e. treated thermally to eliminate the volatile constituents of the organic components. This is carried out by customary methods, generally at temperatures above 650° C. and in the absence of atmospheric oxygen. The organic binders have the task of strengthening the shaped body and being converted during the carbonization into carbon or into carbides by further reaction, and this carbon or these carbides then form(s) the inorganic binder phase. Preference is therefore given to organic binders which give a high carbon yield on carbonization, e.g. phenolic resins, melamine resins, polyimides, pitches, epoxy resins or polyurethanes. If not only carbon but also carbides are to be present in the inorganic binder phase, then these are, according to the invention, preferably formed during the thermal treatment of the green body from the decomposition products of the organic binder and additions of carbide-forming metal. The carbide-forming metals preferably include at least one of the metals from the group consisting of Si, Ti, Fe, Ni and Cr. Particular preference is given to an inorganic binder phase of silicon carbide being formed during the thermal treatment. The thermal treatment is typically carried out at temperatures of at least 1200° C. The amount of organic binder and, if applicable, the added metal, used in the mixture is selected so that the sum of the mass fractions of carbon and carbides is in the range from 5 to 50% in the friction material after carbonization or carbide formation. The mass fraction is preferably at least 10% and particularly preferably at least 15%. The use of this binder phase has the advantage that the carbon formed additionally functions as substance which modifies the coefficient of friction (lowers the coefficient of friction) and the carbides can function as substances which modify the coefficient of friction or as friction promoters (substances which increase the coefficient of friction).

In the variant with oxide ceramic bonding, a ceramic body is produced by the shaping and sintering processes customary in the ceramics industry. The additives to the friction material are usually added prior to sintering at about 1000° C. up to about 1500° C., depending on the nature of the metal oxides. Typical compositions have mass fractions of metal oxides of at least 50% and preferably at least 70%.

Although a distinction is formally made between the oxide ceramic bonding and the bonding by means of carbon or carbides, it is also possible to realize mixed forms of these two types of bonding in the same material. This is, for example, the case when carbon- or carbide-forming substances together with metal oxides which have a melting point lower than MgO or sinter at temperatures significantly below the melting point of MgO are added as additives. The mass fraction of carbon and/or carbides in the material of the invention is advantageously at least 5%. If desired, carbon and/or carbides, in particular graphite or silicon carbide, may be added as additives to the starting mixtures.

In a further advantageous embodiment of the invention, the friction linings of the invention contain fibers or whiskers as additive. They can act as reinforcing component for the material or as materials which modify the frictional behavior. Use is typically made of carbon fibers, heat-resistant polymer fibers, whiskers of metals or compounds such as oxides, borides, carbides or nitrides, metal fibers or turnings in volume fractions of up to 35%. Carbon fibers in mass fractions of from 10 to 30% have been found to be particularly advantageous, since they combine a good reinforcing action and good tribological properties. Among polymer fibers, aramid fibers, acrylic fibers and cellulose fibers are particularly useful. As metal fibers, use is typically made of fibers of steel, copper or copper alloys.

In the friction linings of the invention, it is possible to use further additives, namely substances which modify the coefficient of friction, e.g. Cu, Sn, Sb, MnS, $Sb_2O_3$ and SnO, or lubricants such as $MoS_2$, graphite and boron nitride or friction promoters such as $Al_2O_3$, $ZrO_2$, $ZrSiO_4$, SiC and $SiO_2$, in each case in small amounts. For the purposes of the present invention, the expression small amounts means that the mass fraction of the additive concerned is in each case not more than 5% of the mass of the friction lining.

The invention claimed is:

1. A process for producing a ceramic brake lining comprising a material consisting essentially of magnesium oxide which is present in the form of ceramic particles bound by carbon and/or carbides, wherein the material has a mass fraction of at least 50% of magnesium oxide, wherein the cohesion of the material is effected by bonding with carbides, wherein a shapeable mixture of pulverulent magnesium oxide, carbide-forming metals selected from the group consisting of Ti, Ni, and Cr, additives comprising carbon fibres be present in a volume fraction up to 35%, and thermally curing organic binders is produced in a first step, this mixture is brought into the desired shape by pressing in a second step to provide a shaped mixture, and the shaped mixture is cured to produce a green body with the aid of the said thermally curing organic binders in a third step, and the green body produced in this way is carbonised in a fourth step at temperatures above 650° C. and in the absence of atmospheric oxygen, wherein carbon is formed during carbonisation, and carbides are formed in a thermal treatment carried out at a temperature of at least 1200° C. from the added carbide-forming metals selected from the group consisting of Ti, Ni, and Cr, and the carbon formed during the said carbonisation by decomposition of the said organic binders, which carbides form an inorganic binder phase during the said thermal treatment and bind the said magnesium oxide.

2. The process of claim 1 wherein the additives are selected from the group consisting of inorganic binders, friction promoters and lubricants with the sum of the mass fractions of the additives in the materials being below 50%.

3. The process of claim 2 wherein the friction promoters are selected from the group consisting of aluminum oxide, zirconium dioxide, zircon (ZrSiO4), silicon carbide and silicon dioxide.

4. The process of claim 2 wherein the lubricants are selected from the group consisting of molybdenum disulfide, graphite and boron nitride.

5. The process as claimed in claim 1, wherein the sum of the mass fractions of carbon and carbides in the material forming the friction lining is in the range from 5% to 50%.

6. The process as claimed in claim 1, wherein the carbon fibres are in a mass fraction of from 10% to 30%.

7. A process for producing a ceramic brake lining comprising a material consisting essentially of magnesium oxide which is present in the form of ceramic particles bound by carbon and/or carbides, wherein the material has a mass fraction of at least 50% of magnesium oxide, wherein the cohesion of the material is effected by bonding with carbides, wherein a shapeable mixture of pulverulent magnesium oxide, carbide-forming metals selected from the group consisting of Ti, Ni, and Cr, additives comprising carbon fibres be present in a mass fraction of from 10 to 30%, and thermally curing organic binders is produced in a first step, this mixture is brought into the desired shape by pressing in a second step to provide a shaped mixture, and the shaped mixture is cured to produce a green body with the aid of the said thermally curing organic binders in a third step, and the green body produced in this way is carbonised in a fourth step at temperatures above 650° C. and in the absence of atmospheric oxygen, wherein carbon is formed during carbonisation, and carbides are formed in a thermal treatment carried out at a temperature of at least 1200° C. from the added carbide-forming metals selected from the group consisting of Ti, Ni, and Cr, and the carbon formed during the said carbonisation by decomposition of the said organic binders, which carbides form an inorganic binder phase during the said thermal treatment and bind the said magnesium oxide.

8. The process of claim 7 wherein the additives are selected from the group consisting of inorganic binders, friction promoters and lubricants with the sum of the mass fractions of the additives in the materials being below 50%.

9. The process of claim 8, wherein the friction promoters are selected from the group consisting of aluminum oxide, zirconium dioxide, zircon (ZrSiO4), silicon carbide and silicon dioxide.

10. The process of claim 8, wherein the lubricants are selected from the group consisting of molybdenum disulfide, graphite and boron nitride.

11. The process as claimed in claim 7, wherein the sum of the mass fractions of carbon and carbides in the material forming the friction lining is in the range from 5% to 50%.

* * * * *